Sept. 27, 1955 W. J. MELDAHL 2,718,741
PULVERIZING CHAIN HAMMER
Filed July 23, 1954

INVENTOR:
WALDEMAR J. MELDAHL
BY: Emerson B Donnell
ATTORNEY

United States Patent Office 2,718,741
Patented Sept. 27, 1955

2,718,741

PULVERIZING CHAIN HAMMER

Waldemar J. Meldahl, Racine, Wis., assignor to J. I. Case Company, Racine, Wis., a corporation of Wisconsin Application July 23, 1954, Serial No. 445,285

11 Claims. (Cl. 55—118)

This invention relates to a pulverizing chain hammer, and, more particularly, it relates to a pulverizing chain employed in a machine for shredding corn stalks, disintegrating lumps of dirt, and performing like operations.

It is a primary object of this invention to provide a pulverizing chain which can be quickly disassembled but only with a combination of predetermined steps.

Another object of this invention is to provide a pulverizing chain which can be quickly disassembled but yet be secure in the assembled position and be sufficiently sturdy to provide the required strength in operation.

Other objects and advantages will become apparent upon reading the following description in conjunction with the accompanying drawings, wherein.

Figure 4:
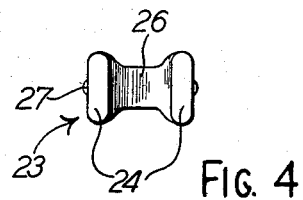
Figure 2:
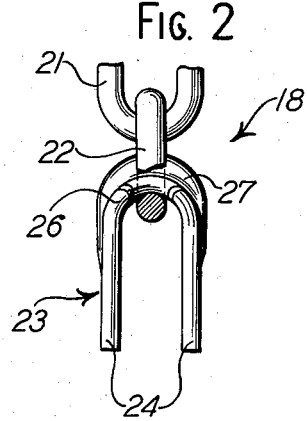
Fig. 2 is an enlarged side view of a fragment of the embodiment shown in Fig. 1 but with a part thereof broken away.
Figure 3:
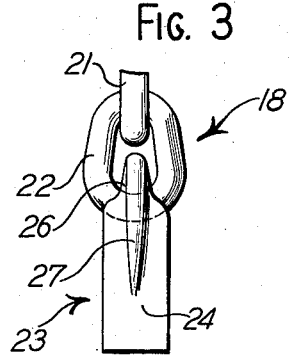
Figure 5:
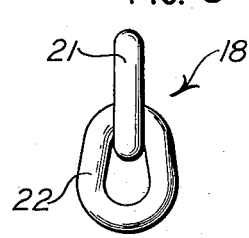
Figures 7, 8:
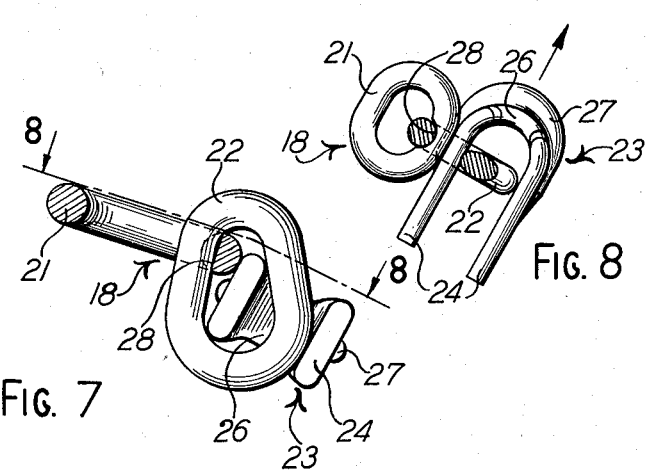
Figure 6:
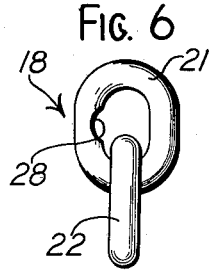

Fig. 3 is a side view of the embodiment shown in Fig. 2.
Fig. 4 is an end view of a part shown in Figs. 2 and 3.
Fig. 5 is a side view of parts shown in Figs. 2 and 3.
Fig. 6 is a side view of the embodiment shown in Fig. 5.
Fig. 7 is a view of the embodiment shown in Figs. 2 and 3 but with the parts thereof in different relative positions.

Fig. 8 is a sectional view taken on the bent section line 8—8 of Fig. 7.

Similar reference numerals refer to similar parts throughout all of the views.

Figure 1:
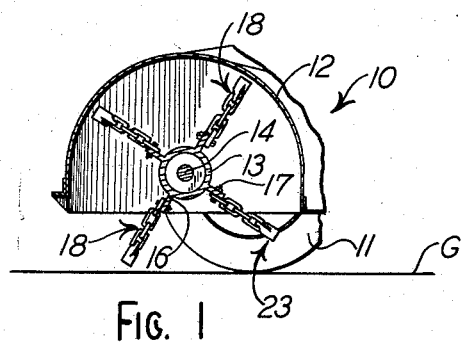
Fig. 1 is a longitudinal sectional side elevational view of a fragment of a pulverizing machine containing an embodiment of this invention.

With reference to Fig. 1, there is shown a fragment of a pulverizing machine 10 which is normally conveyed by a tractor or the like, not shown. The machine 10 usually includes ground wheels 11 to suitably support the frame of the machine for mobilizing it over the ground indicated by the line "G." Attached to the frame of the machine is a fender or cover 12 of a semi-circular shape and disposed transversely to the line of movement of the machine. Rotatably mounted within the fender 12, and substantially on the axis thereof, is a hub 13 which can be mounted on a shaft 14 as indicated. The hub 13 is shown provided with four radially extending and equally spaced flanges 16 which contain holes for receiving bolts 17. As further shown, each of the bolts 17 secures a pulverizing chain 18 to the rotatable hub 13.

Since the foregoing is of a conventional machine, no further description thereof is necessary for a disclosure of this invention. It should, of course, be understood that rotation of the hub 13 causes the chains 18 to extend radially outwardly from the hub under the influence of centrifugal force. The outer ends of the chains then extend to the ground where they strike material, such as corn stalks or lumps of dirt, to pulverize it.

Figs. 2 and 3 show an enlargement of the outer end of each of the chains 18. Here it is seen that the chains include a link 21 and a link 22 with the links being locked or linked together in the usual manner of forming a chain. Also, the chains 18 terminate with a U-shaped hammer 23 linked onto the last link 22, as shown. Fig. 5 shows a free-body view of the links 21 and 22 while Fig. 4 shows a free-body view of the hammer 23. The latter, therefore, preferably consists of a pair of enlarged ends or legs 24, constituting an upset element, with an arcuate interconnecting section 26. It is also shown that the section 26 includes a protruding rib 27 which extends around the outer side of the curve of section 26 and along the center line of the hammer 23. It should further be noticed in Fig. 3 that the hammer section 26 is narrower than the corresponding dimension of the legs 24. With the latter mentioned arrangement, the hammer contains the desired weight and size and still fits into the link 22.

Fig. 6 shows a side of the links 21 and 22 shown in Fig. 5 and, particularly, it shows a notch or depression 28 on the inner periphery of the link 21. The size of the depression 28 is sufficient to receive the adjacent side of the link 22 so that the two links can be positioned in a manner to provide an increased clearance through the loop of the link 22. This feature is shown in Fig. 7 wherein the link 22 is engaged within the depression 28. With the links so arranged, the increased clearance in the link 22 is sufficient to allow the hammer 23 to be maneuvered out of the link 22. To achieve this, the hammer is positioned within the link 22 in the position shown in Figs. 7 and 8 and then withdrawn from the link 22 in the direction of the arrow shown in Fig. 8. The hammer can thus be readily removed, for replacement or the like, after a predetermined series of movements. Of course, the reverse of these movements will effect the assembly of the hammer in the chain.

Since the chain 18 is maintained extended under centrifugal force during the rotation thereof, it is preferred that the depression be located in the side of the link 21 rather than in the end where the link 22 is engaged during said rotation. Thus, the links permit removal of the hammer only upon an arrangement of the links 21 and 22, which arrangement is not likely to exist in the pulverizing operation of the chain.

It should also be noticed in Fig. 7 that the links 21 and 22 and the hammer 23 are dimensioned to permit the thickness of the hammer leg, plus the reduced portion of the link 21, to fit within the loop of the link 22. Further, the hammer rib 27 is available to lend strength and weight to the hammer but yet it does not obstruct the removal of the hammer from the link.

While a specific embodiment of this invention has been shown and described, it should be obvious that numerous changes could be made within the scope of the invention and it should, therefore, be limited only by the appended claims.

I claim:

1. In a shredding and beating machine of the type having a rotating hub and a plurality of centrifugally extended chains fastened to said hub to control crop engaging hammers, the combination of at least two interengaging links having a predetermined cross section and a curved hammer, said hammer comprising a shank portion of a cross section substantially equivalent to that of said links and a pair of spaced apart flattened blades, said links having openings smaller than necessary to admit one of said flattened blades along with the cross section of one of said links, one of said links receiving said hammer shank and the other link of said links having an inner periphery providing a recess into which the first link is fitted to provide a sufficient displacement of the second link with respect to said first link to furnish space in said first link for passage therethrough of one of said flattened blades for assembly of said hammer with or removal from said chain links.

2. In a shredding and beating machine of the type having a rotating hub and a plurality of centrifugally extended chains fastened to said hub and controlling crop engaging hammers, the combination of at least two interengaging links having a predetermined cross section and a fork-like hammer, said hammer comprising a shank portion and a pair of spaced apart blades, said links having openings smaller than necessary to admit one of said blades along with one of said links, one of said links receiving said hammer shank and the other link having an inner periphery providing a recess into which the first link is fitted to provide a sufficient displacement of said second link in said first link to furnish space in said first link for passage therethrough of one of said blades for assembly of said hammer with or removal from said chain links.

3. In a shredding and beating machine of the type having a rotating hub and a plurality of centrifugally extended chains fastened to said hub and controlling crop engaging hammers, the combination of at least two interengaging links having a predetermined cross section and a hammer, said hammer comprising a shank portion and a pair of spaced apart upset ends, said links having openings smaller than necessary to admit one of said upset ends along with the cross section of one of said links, one of said links receiving said hammer shank and the other link having an inner periphery providing an offset portion into which the first link is fitted to provide sufficient displacement of said second link in said first link to furnish space in said first link for passage therethrough of one of said upset ends for assembly of said hammer with or removal from said chain links.

4. In a crop engaging hammer, the combination of at least two interengaging chain links having a predetermined cross section and a fork-like member, said member comprising a shank portion of a cross section substantially equivalent to that of said links and a pair of spaced apart flattened blades, said links having openings smaller than necessary to admit one of said flattened blades along with one of said links, one of said links receiving said member shank and the other link having an inner periphery providing a recess into which the first link is fitted to provide displacement of said second link in said first link sufficient to furnish space in said first link for passage therethrough of one of said flattened blades for assembly of said member with or removal from said chain links.

5. In a crop engaging hammer, the combination of at least two interengaging chain links and a hammer, said hammer comprising a shank portion and an upset element, one of said links being engaged with said shank portion and having an opening small enough to prohibit the passage therethrough of said upset element when also occupied by the other link, and said other link having an offset portion into which the first link is displaced to clear sufficient space within said first link for passage of said upset element.

6. In a crop engaging hammer, the combination of at least two interengaging chain links and a hammer, said hammer comprising a shank portion and an enlarged portion, said enlarged portion being engaged with one of said links, said one of said links having an opening of a size to prohibit the passage therethrough of said enlarged portion when said opening is also occupied by the other of said links, one of said links having an offset portion into which the other of said links is displaced to clear sufficient space within said link for the passage of said enlarged portion.

7. A quick changing hammer and chain assembly for use with a shredding machine of the type having a power driven rotor positioned transverse to the direction of travel of the machine, said assembly including a chain formed of a plurality of links of substantially equal size, the second to last link having a depression formed on the inner circumference of one side thereof, a U-shaped hammer having parallel spaced apart flat legs and engageable with the last link of said chain, the interior periphery of said last link being of a size sufficient to permit one of said flat legs of said hammer to be received therein so that said hammer can be attached and detached with said chain, said interior periphery of said link being of a size insufficient to receive one of said legs of said hammer when said last link is not positioned within said depression of said second to last link.

8. A flexible chain formed of a plurality of interengaging links, a hammer having enlarged end portions adapted to be received by the last link in said chain, one of the last two links in said chain having a depression positioned to engage the other of said last two links when said last two links are positioned substantially at right angles to each other, said depression being sufficient to provide an opening in the interior of said last link to permit said one of said enlarged end portions of said hammer to be received within said opening only when said other of said links engages said depression.

9. In a pulverizing chain having a series of at least two chain links and a hammer, the combination comprising a linked together permanent assembly of said two chain links with one of said two links having an offset portion on the periphery of its loop for receiving an adjacent portion on the other one of said two links whereby an enlarged opening is provided in one of said two links, an enlarged end portion on said hammer of a size larger than the opening in one of said two links in one cross sectional dimension but smaller than said enlarged opening in one of said two links.

10. A rotating chain hammer comprising at least two chain links permanently linked together, at least one of said links having an offset portion on a side thereof which abuts the other of said links when said links are placed in a predetermined position, a hammer, a portion on said hammer of a size which permits said hammer to attach and detach within the loop of one of said links only when said links are placed in said predetermined position.

11. A flexible chain formed of interengaging links of substantially equal size, one end of the second to last link having a depression formed on the inner circumference thereof, the last link of said chain adjacent said second to last link being formed so as to be received by said depression when said last link is positioned at substantially right angles with respect to said second to last link, and a U-shaped hammer having at least one flat leg portion, said flat leg portion being so formed as to be slideably received in the interior of said last link when said link is at substantially a right angle with said second to last link and yet received by said depression, the interior of said last link being insufficient to slideably receive said leg portion when said last link is not received by said depression.

No references cited.